June 5, 1956

J. O. JACKSON 2,748,569

CONTROLLING DELIVERY OF AIR TO INDUCTION
AND BLOW DOWN TYPE WIND TUNNELS

Filed Nov. 14, 1950

INVENTOR
James O. Jackson
BY
HIS ATTORNEYS

June 5, 1956

J. O. JACKSON 2,748,569

CONTROLLING DELIVERY OF AIR TO INDUCTION
AND BLOW DOWN TYPE WIND TUNNELS

Filed Nov. 14, 1950

INVENTOR.
James O. Jackson

BY

HIS ATTORNEYS

INVENTOR.
James O. Jackson

HIS ATTORNEYS

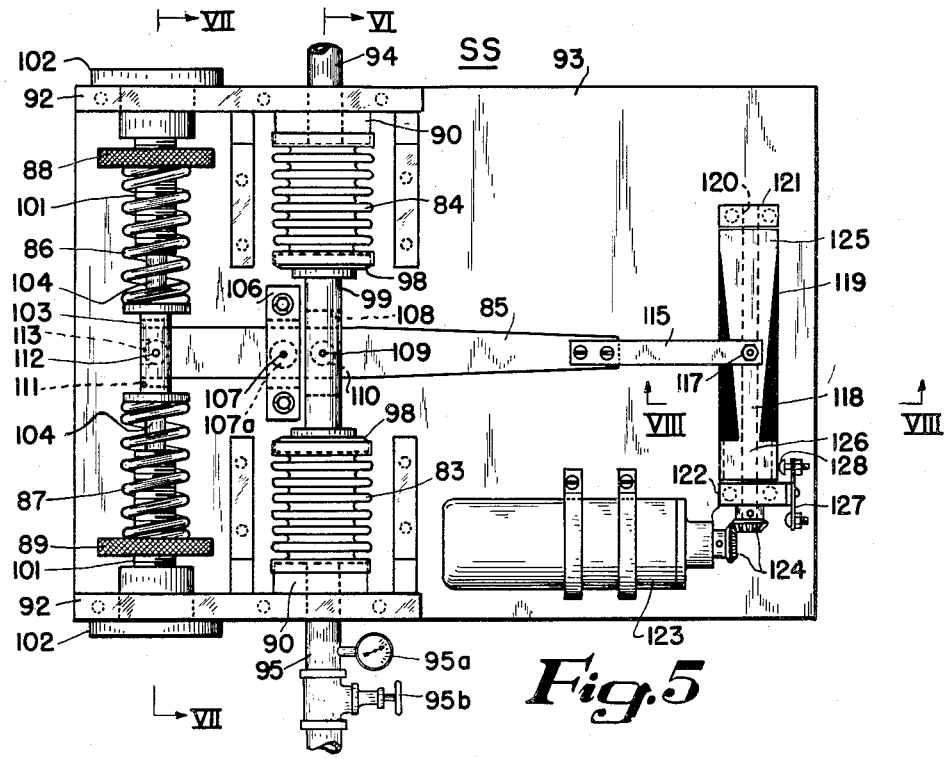
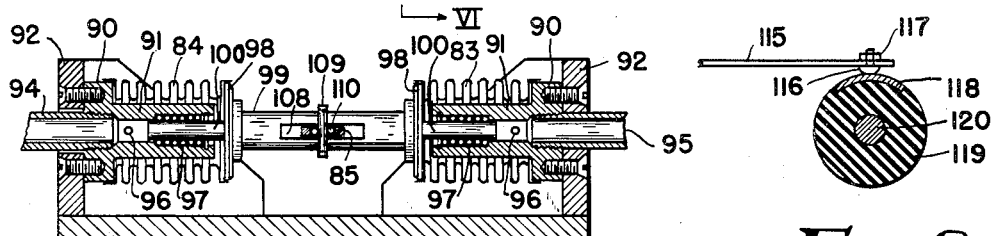
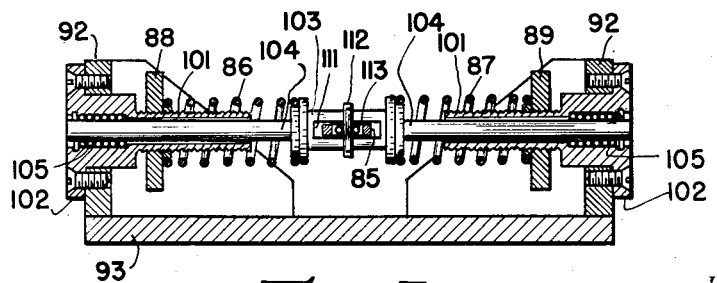
June 5, 1956  J. O. JACKSON  2,748,569
CONTROLLING DELIVERY OF AIR TO INDUCTION
AND BLOW DOWN TYPE WIND TUNNELS
Filed Nov. 14, 1950  5 Sheets-Sheet 4
Fig.5
Fig.6
Fig.8
Fig.7
INVENTOR.
James O. Jackson
BY
HIS ATTORNEYS United States Patent Office 2,748,569
Patented June 5, 1956

2,748,569

CONTROLLING DELIVERY OF AIR TO INDUCTION AND BLOW DOWN TYPE WIND TUNNELS

James O. Jackson, Crafton, Pa., assignor to Pittsburgh-Des Moines Steel Company, Pittsburgh, Pa., a corporation of Pennsylvania Application November 14, 1950, Serial No. 195,531

8 Claims. (Cl. 60—52)

This invention relates to supersonic wind tunnels of the "blow down" and induction types and more particularly to pressure control or regulating valve mechanisms for use in connection with the air supply to such wind tunnels.

One object of this invention is to produce a valve and its operating and control mechanisms by means of which air at a substantially constant rate of mass flow and at a substantially constant pressure, such as required in such types of wind tunnels, can be delivered from a stored supply of air under pressure.

Another object is to produce an improved hydraulic system for operating and controlling pressure control or regulating valves.

A further object of this invention is to produce an improved hydraulic system including a reciprocating hydraulic motor for operating a valve for controlling the flow of air from a stored source of air under pressure to a wind tunnel of either the induction type or the "blow down" type.

A still further object is to produce a closed hydraulic system for operating a pressure control or regulating valve so as to deliver, from a stored supply of air under pressure, air at a substantially constant rate of mass flow and at a substantially constant pressure.

These and other objects, I attain by means of the apparatus described in the specification and illustrated in the drawings accompanying and forming part of this application.

In the drawings:

Fig. 5 is a top plan view of the secondary control switch device which is adapted to be operated in series with the primary control switch device;

Fig. 6 is a view taken on line VI—VI of Fig. 5;

Fig. 7 is a view taken on line VII—VII of Fig. 5;

Fig. 8 is a view taken on line VIII—VIII of Fig. 5; and

The control or regulating valve mechanism of this invention in addition to the valve per se includes a reciprocating hydraulic motor for moving such valve in both opening and closing directions. It also includes a system of piping which in effect is a closed system and which connects with both the control valve opening and closing sides of such hydraulic motor. This system of piping includes a relatively low pressure rotary pump for filling the piping system with hydraulic liquid and for maintaining such system full of such liquid. It also includes a relatively high pressure positive displacement reversing rotary pump, and means for controlling the operation of such reversing pump.

*Pressure control valve*

Figure 1:
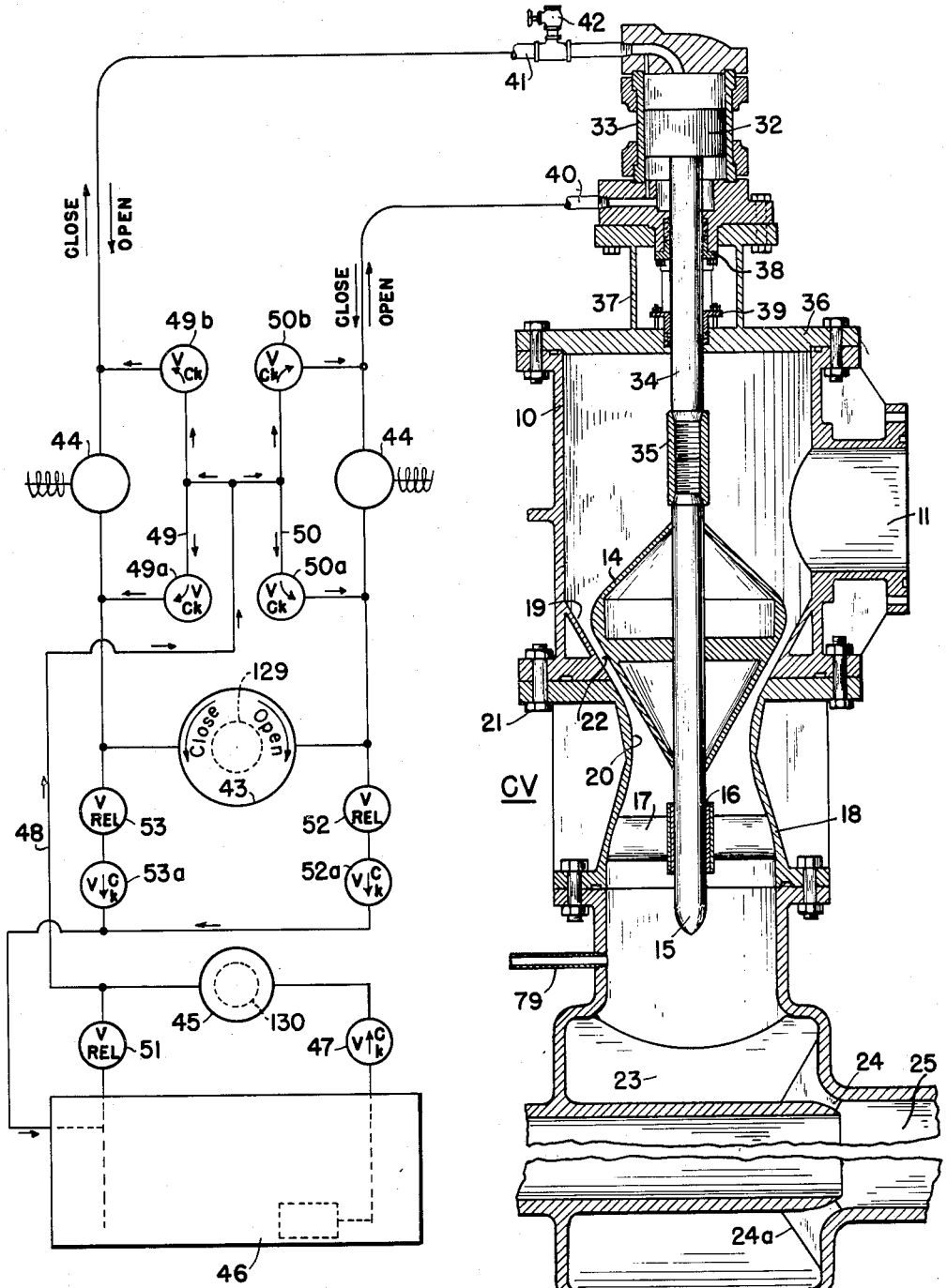
Figure 1 is a view in sectional elevation of a pressure regulating valve and its hydraulic motor and includes a schematic diagram of a closed hydraulic system for operating such motor in accordance with this invention; such valve being shown discharging into the inductor of an induction type wind tunnel.

The pressure control valve marked CV as disclosed in Figure 1 comprises a valve housing 10 having an inlet 11 adapted to be connected by piping 12 (Fig. 2) to a source of air under pressure such as a container 13. Valve plug 14 which is streamlined on opposite ends to permit a smooth flow of air thereover, has the lower end portion of its shaft or stem 15 supported in a self-lubricating bearing 16 which is supported by three equally spaced streamlined spokes 17 carried by wall 18 of the valve housing outlet passage.

The valve housing outlet passage comprises a fairing 19 and a diffuser nozzle-like portion 20 which is preferably formed as a separate part of the valve housing which is secured thereto by bolts 21.

When the control valve is in operation, air under pressure passing into the valve housing through inlet 11 passes between plug 14 and fairing 19, through sonic throat 22 where it reaches sonic velocity. It then passes into diffuser nozzle portion 20 where it is diffused up to control pressure as it enters inductor chamber 23.

The air delivered to inductor chamber 23 passes therefrom through annular nozzle 24 and expands to supersonic velocity at a very low pressure in the region 25. The mixing in region 25 imparts downstream velocity to the surrounding air and induces air to flow into intake 26 of the wind tunnel through sonic throat 27, into supersonic nozzle 28 where it expands to supersonic velocity. The supersonic flow can be viewed and photographed through window 29.

Induced air from 26 and the inductive air from 23 mix in the region 25, are raised to atmospheric pressure in diffuser 30 and are discharged to the atmosphere at end 31 of the diffuser.

A series of evenly spaced radially extending vanes 24a are positioned within the annular nozzle 24 to prevent swirling of the air passing from inductor chamber 23 through annular nozzle 24.

*Hydraulic motor*

The hydraulic motor for moving plug 14 of the control valve comprises a piston 32 mounted for reciprocation within a cylinder 33 and having its piston rod 34 connected to the upper end of stem 15 of plug 14 by means of a threaded sleeve 35.

Cylinder 33 is carried by and spaced from head 36 of valve housing 10 by means of a support member 37 which is so formed as to give access to stuffing boxes 38 and 39 which respectively seal the joints between rod 34 and the cylinder 33 and rod 34 and valve housing 10.

*Hydraulic system for operating the hydraulic motor*

The hydraulic system is shown in the left-hand portion of Fig. 1 and comprises what in effect is a closed system of piping having one leg 40 thereof connected with the control valve opening side of the hydraulic motor, and leg 41 which connects with the control valve closing side of such motor. Leg 41 adjacent the top of cylinder 33 (its highest point) is provided with a hand operated relief valve 42 which is opened while the system is being filled with hydraulic liquid to allow the escape of air from the system and remains closed after the system is filled with such liquid.

Connected to legs 40 and 41 of the hydraulic system is a reversing, relatively high pressure positive displacement pump 43 which is driven by a reversing electric motor, see 129 of Figure 1. Each of the legs 40 and 41 between cylinder 33 and pump 43 is provided with a normally closed solenoid operated shut-off valve 44.

In order to fill the hydraulic system with hydraulic liquid and maintain such system filled with such liquid, a relatively low pressure positive displacement pump 45 draws hydraulic liquid from a reservoir 46 through a check valve 47 and discharges the same into the system by way of a pipe 48 and branches 49 and 50 adapted to discharge hydraulic liquid into the system on opposite sides of one of the solenoid operated shut-off valves 44; branch 49 discharging into leg 41 of the system through check valves 49a and 49b and branch 50 discharging into leg 40 of the system through check valves 50a and 50b. When the hydraulic system is filled with hydraulic liquid and air relief valve 42 is closed, excess liquid pumped by pump 45 is discharged back into reservoir 46 through relief valve 51. Excess liquid in leg 40 is discharged back to reservoir 46 through relief valve 52 and check valve 52a while excess liquid in leg 41 is discharged through relief valve 53 and check valve 53a to reservoir 46.

In one installation pump 45 was a non-reversible positive displacement pump of the gear type capable of pumping to 125 pounds per square inch pressure and pump 43 which was a reversible pump of the same type capable of pumping to a pressure of 1000 pounds per square inch.

In this installation, relief valve 51 was set to open at a pressure of 30 pounds per square inch and relief valves 52 and 53 were each set to open at a pressure of 900 pounds per square inch. Shut off valves 44 are normally held closed by spring pressure and are opened by solenoids which are operated simultaneously with the starting of pump 43 in either direction.

Pump 45 is operated by a non-reversible electric motor (shown diagrammatically as 130) and pump 43 is operated by a reversible electric motor (shown diagrammatically as 129, see Figure 1).

*Means for controlling the operation of pump 43*

The means for controlling the operation of high pressure pump 43 comprises a primary pressure controlled switch mechanism and a secondary pressure controlled switch mechanism operating in series with such primary controlled switch mechanism.

*Primary pressure controlled switch mechanism*

Figure 3:
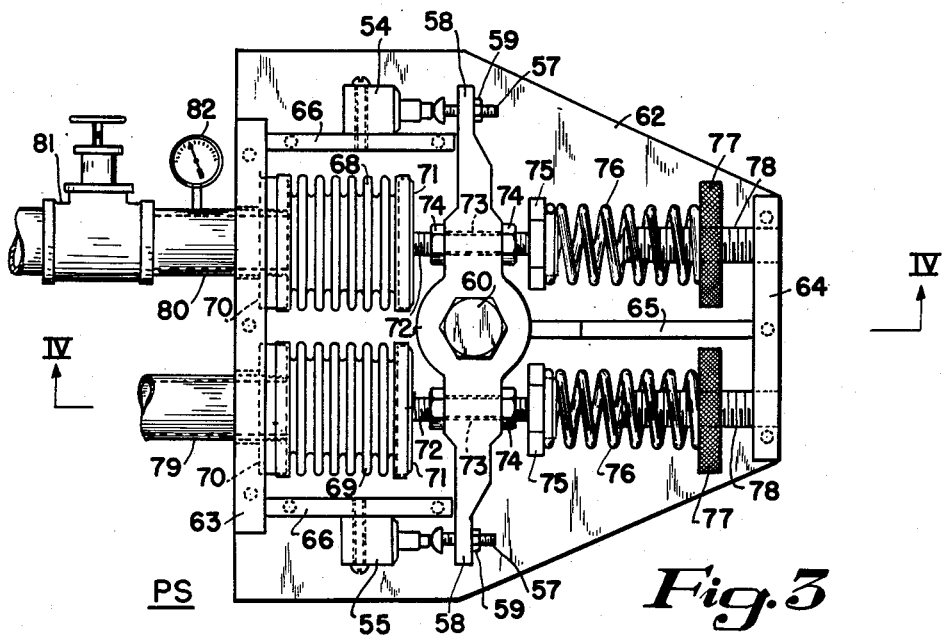
Fig. 3 is a top plan view of the primary control switch device for controlling the operation of the pump that moves the pressure regulating valve by means of the hydraulic fluid in the closed hydraulic system of Fig. 1 in opening and closing directions.
Figure 4:
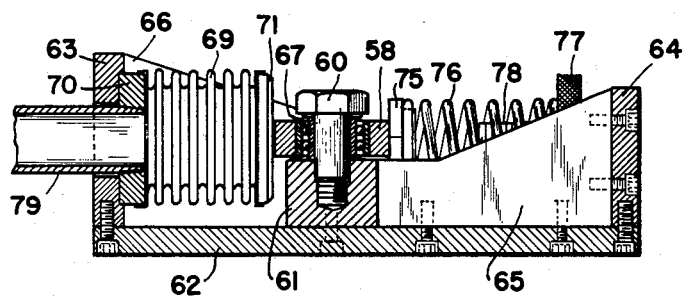
Fig. 4 is a view taken on line IV—IV of Fig. 3.
Figure 9:
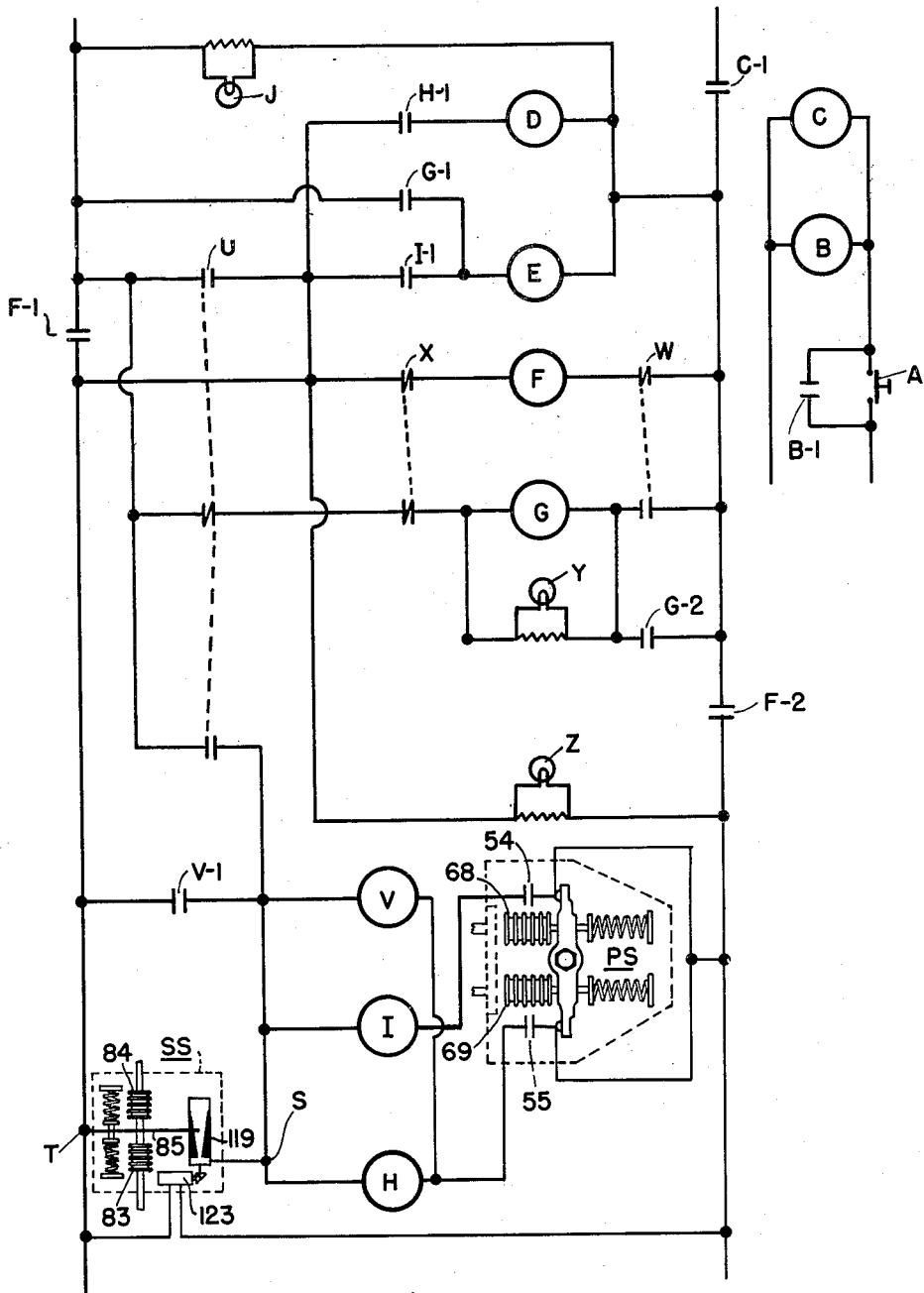
Fig. 9 is a schematic wiring diagram of the pressure regulating valve controls.

This primary switch mechanism marked PS is disclosed in more or less detail in Figs. 3 and 4 and schematically in the right-hand lower corner of Fig. 9. The mechanism comprises two normally open micro switches 54 and 55 having their plungers operated by two adjustment screws 57 which extend through threaded openings in opposite ends of a balance beam 58. Screws 57 are locked in adjusted position by lock nuts 59.

Balance beam 58 is pivotally mounted on a cap screw 60 secured to the central member 61 of a frame comprising such central member, a base 62, end members 63 and 64, a bracing member 65 and bracket members 66—66 which carry the micro switches 54 and 55. A ball bearing 67 having its inner race carried by such cap screw 60 has its outer race carried by balance beam 58, thus allowing free pivotal movement of such beam 58 about the axis of cap screw 60.

Two pressure bellows 68 and 69 are arranged side by side between micro switches 54 and 55. These bellows are preferably of the Sylphon type and each has a head 70 which is secured to end member 63 and is provided with a threaded tapered opening in line with an opening in such end member to receive the threaded end of a tube or pipe.

The opposite end of each bellows is closed by a head 71 provided with a threaded extension 72 which extends through a hole 73 formed in balance beam 58. Adjusting lock nuts 74 carried on threaded extension 72 are located on opposite sides of balance beam 58 as disclosed in Fig. 3.

The outer or distal end of each of these threaded extension 72 is provided with a member 75 which serves as a seat for a spring 76. Springs 76 are held against these seat members 75 by means of spring compression adjustment nuts 77 threaded onto screws 78 which are rigidly secured to end members 64 of the switch frame.

A tube or pipe 79 connects bellows 69 with the outlet of the pressure control valve which in reality forms part of the inductor chamber 23. Bellows 69 therefore is subjected to the pressure within the inductor chamber. The tube or pipe which connects with the interior of bellows 68 is numbered 80 and is adapted to be connected to a source of air under pressure. Tube or pipe 80 is provided with a shut-off valve 81 preferably of the needle type and with a pressure gauge 82 which is located between it (such valve) and bellows 68. The source of air under pressure may, if desired, be the storage container 13 or it may be merely a hand operated pump.

Spring compression adjusting nuts 77 are used to balance beam 58 in a neutral position. Springs 76 and bellows 68 and 69 which are preferably identical, are selected with spring moduli that will give desired sensitivity to the switch mechanism. Springs 76 are given enough initial compression by nuts 77 to make them (springs 76) follow the movements of beam 58. The arrangement is such that, regardless of the position of beam 58, springs 76 always exert such pressure on beam as tends to return it (such beam) to neutral position in which both micro switches 54 and 55 are open.

In the installation above referred to, each of the micro switches 54 and 55 which were utilized only required movement of beam 58 of about .002" in either direction.

*Secondary pressure controlled switch mechanism*

This secondary switch mechanism marked SS is disclosed in more or less detail in Figs. 5–8 inclusive and more or less schematically in the lower left-hand corner of Fig. 9.

This switch mechanism employs two pressure bellows 83 and 84, a pivotally mounted beam or arm 85 actuated by the movement of such bellows, and springs 86 and 87 which oppose the movement of beam 85 occasioned by such bellows. The compression of springs 86 and 87 is so adjusted by adjustment nuts 88 and 89 that when the interiors of bellows 83 and 84 are subjected to the same pressure (for example, atmospheric pressure) such springs tend to hold beam or arm 85 in mid or balanced position.

The outer ends of bellows 83 and 84 are secured to heads 90 each having a cylindrical extension 91 which is but slightly shorter than the bellows which encircles the same and each such extension 91 thus serves as a stop to limit the bellows movement. Heads 90 are secured to side members 92 of the switch mechanism frame which in addition to such side members 92 comprises a base 93. Pipes or tubes 94 and 95 extend through openings in side members 92 and are secured within threaded through openings in bellows heads 90.

The cylindrical extension 91 of each bellows head 90 is provided with two bores. The inner, or that adjacent the inner end of pipe or tube 94 or 95 as the case may be, connects with the space between the bellows and the cylindrical extension by means of a hole or channel 96. Within the other bore, which is of greater diameter, a ball bushing 97 is located.

The inner ends of bellows 83 and 84 are secured to heads 98 of a bellows spool 99. Each such spool head 98 is provided with an outwardly extending cylindrical member 100 which slidingly fits within one of such ball bushings.

Spring compression adjustment nuts 88 and 89 are threaded on hollow cylindrical extensions 101 of hollow shouldered support members 102. The inner ends of springs 86 and 87 bear against the heads of a spring spool 103 which has oppositely extending cylindrical end members 104 of reduced diameter which are adapted to slide within ball bushings 105 located within support members 102.

Beam or contact arm 85 passes through an opening or slot in a pivot block 106 carried by base 93. Beam or arm 85 is provided with a pocket or opening to receive a ball bearing, and a vertical pin 107 extending through such pivot block and working within such bearing, serves as the pivot pin for such beam or arm. Such bearing is indicated by dotted circle 107a.

Beam or arm 85 passes through an elongated slot 108 in bellows spool 99, and a pin 109 which passes through spool 99 opposite the center of slot 108 extends through a ball bearing 110 which fits within a hole or pocket formed for its reception in beam or arm 85.

Beam or arm 85 also passes through an elongated slot 111 in spring spool 103, and a pin 112 which passes through spring spool 103 at the center of slot 111 passes through a ball bearing 113 which fits within a hole or pocket formed for its reception in beam or arm 85. Beam or arm 85 is provided with a spring extension 115 which is electrically insulated from arm 85, and at its outer end is provided with a contact member 116 which is threaded through spring extension 115 and is locked in position by means of a nut 117. The lower end of contact member 116 is rounded and preferably silver plated in order to make good electrical connection with the metal part 118 of a drum 119.

The shaft 120 of drum 119 is mounted for rotation in bearing blocks 121 and 122 and is rotated by an electric motor 123 through gears 124.

The drum is formed of dielectric material and metal part 118 which is preferably copper, is embedded in the dielectric material so that its outer face is flush with the face of the drum. Metal part 118 which serves as a contact member encircles the drum at its end adjacent bearing block 121 and from this portion which is numbered 125, tapers in width to portion 126 at its opposite end where it again encircles the drum as shown in Figs. 1 and 9.

A contact arm 127 mounted on bearing block 122 and electrically insulated from such block is provided with a contact member 128 which bears on continuous drum encircling part 126 of metal contact member 118.

The taper of metal part 118 between parts 125 and 126 of drum 119 is calculated from the hydraulic characteristics of high pressure pump 43, the flow characteristics of the control valve CV, the wind tunnel characteristics and the R. P. M. of drum 119, so that at all times during a tunnel run, control valve CV is so operated as to maintain a substantially constant flow of air at a substantially constant pressure to inductor chamber 23.

With the control valve closed and the hydraulic system filled with hydraulic liquid, and before high pressure pump 43 is started, it is necessary to fill bellows 68 of the primary pressure controlled switch mechanism PS with air at the pressure it is desired to maintain in chamber 23 of the inductor, and bellows 83 of the secondary pressure controlled switch mechanism SS with air at a pressure that will give the correct rate of movement of control valve CV throughout the operating range of pressure in storage container 13; such pressure being a function of the spring moduli of bellows 83 and 84, and varies with the pressure desired in inductor chamber 23.

It will be understood that bellows 69 of primary switch mechanism PS is connected with inductor chamber 23 and bellows 84 of secondary switch mechanism SS is connected with storage container 13.

In the schematic wiring diagram (Fig. 9) of the pressure regulating valve controls, when normally open push button A is closed, holding coils B and C are energized. Coil B closes contact B-1 which maintains the electric circuit through coils B and C. Coil C closes contact C-1 which makes power available to the control circuit. Coil B also closes power contacts (not shown) to the motor 130 driving low pressure pump 45.

Coil D is the forward holding coil in the starter for the reversible motor 129 that drives pump 43, and coil E is the reverse holding coil for such motor. The contacts which coils D and E close are not shown. The coils D and E also close contacts that energize the solenoid operated valves 44.

Coil F when energized closes contacts F-1 and F-2. Coil G when energized closes contacts G-1 and G-2. Coil H when energized closes contact H-1 and coil I when energized closes contact I-1.

Red light J burns when coil C is energized indicating that the control circuit is energized and ready for operation. PS is the primary pressure switch mechanism shown in detail in Figs. 3 and 4 and SS is the secondary pressure switch mechanism shown in detail in Figs. 5 to 8 inclusive.

Microswitch 55 which is closed by the set pressure in bellows 68, energizes coil H which closes contact H-1 thus energizing coil D and starting high pressure reversing pump 43 forward. This opens control valve CV. Microswitch 54 which is closed by pressure in bellows 69 energizes coil I, closing contact I-1. This energizes closing coil E which causes high pressure pump 43 to operate in the reverse direction, thus moving control valve CV in its closing direction. Bellows 69 is connected by tube or pipe to the inductor chamber 23.

The opening and closing signals given by the closing of microswitches 55 and 54 are passed and blocked alternately as drum 119 in the secondary switch mechanism revolves. The percentage of time that signals are passed depends upon the position of contact member 116 of arm 85 on metal part 118 of drum 119, and this position in turn depends on the pressure in bellows 84 (sphere pressure) relative to the pressure in bellows 83 (set pressure).

In order to operate primary control switch mechanism PS it is necessary to put a pressure into bellows 68 equal to the pressure it is desired to maintain in chamber 23 of the inductor. In order to operate secondary control switch mechanism SS it is necessary to put a pressure in bellows 83 of a determined value that will give the correct rate of movement of control or regulating valve CV throughout the operating range of storage pressure in container 13.

The pressure determined for bellows 83 is a function of the spring moduli of bellows 83 and 84 and the moduli of springs 86 and 87, and varies with the pressure that is being controlled to, that is, the pressure desired in inductor chamber 23 or the pressure desired at the outlet end of the heat accumulator and exchanger when the control valve mechanism of this invention is used in connection with a "blow down" type of tunnel.

For the purpose of obtaining the correct pressure in bellows 83, pipe or tube 95 which connects the interior of such bellows to a suitable source of air under pressure is provided with a pressure gauge 95a and a shut-off valve 95b preferably of the needle type.

After the above pressures are set, button A is pressed, energizing coils B and C, closing contact C-1 and starting low pressure pump 45. Then push button U is pressed which energizes coils F and V and closes contacts F-1, F-2 and V-1. Since micro switch 55 is closed by pressure in bellows 68, contact V-1 maintains circuit through coils V and H. Coil H closes contact H-1 which energizes opening coil D and starts high pressure reversing pump 43 in its forward direction thus opening pressure control valve CV, and admitting air to inductor chamber 23.

When pressure control valve CV has opened enough for the pressure in bellows 69 to equal that in bellows 68 (set pressure) micro switch 55 opens, contact V–1 drops open since coil V is deenergized and remains deenergized until starting button U is again pressed. Coil H is also deenergized and contact H–1 opens, stopping high pressure pump 43.

When the delivered pressure drops a very small amount, micro switch 55 is closed and high pressure pump 43 is pulsed forward by signals which are passed through the secondary switch mechanism. The amount of movement of control valve CV on each pulsation depends on the position of contact member 116 of contact arm 85 on part 118 of drum 119 and on the set pressure in bellows 83.

As the storage pressure in container 13 drops, contact arm 85 moves in a direction that will increase the length of each signal passed through it thereby increasing the rate of opening of the control valve until finally a continuous signal is passed when the storage pressure in container 13 approaches control (set pressure). If the controlled pressure should become too high, micro switch 54 will close, energizing coil I intermittently through the secondary switch mechanism which closes contact I–1 and energizes reverse holding coil E thereby inching control valve CV closed until the pressure in bellows 69 is again equal to that in bellows 68 and micro switch 54 opens.

In order to manually close control valve CV at any time during a tunnel run or at the end of a run, push button W is pressed. This deenergizes coil F, energizes coil G, closes contact G–1 and energizes closing coil E. To stop movement of valve CV at any time, push button X is pressed which deenergizes all holding coils and stops high pressure pump 43. Green light Y burns when control valve CV is closing and red light Z burns when it is opening.

In case it is not necessary to use secondary pressure control mechanism SS, direct contact can be made between points S and T and when this is done, coil V and contact V–1 are omitted.

Figure 2:
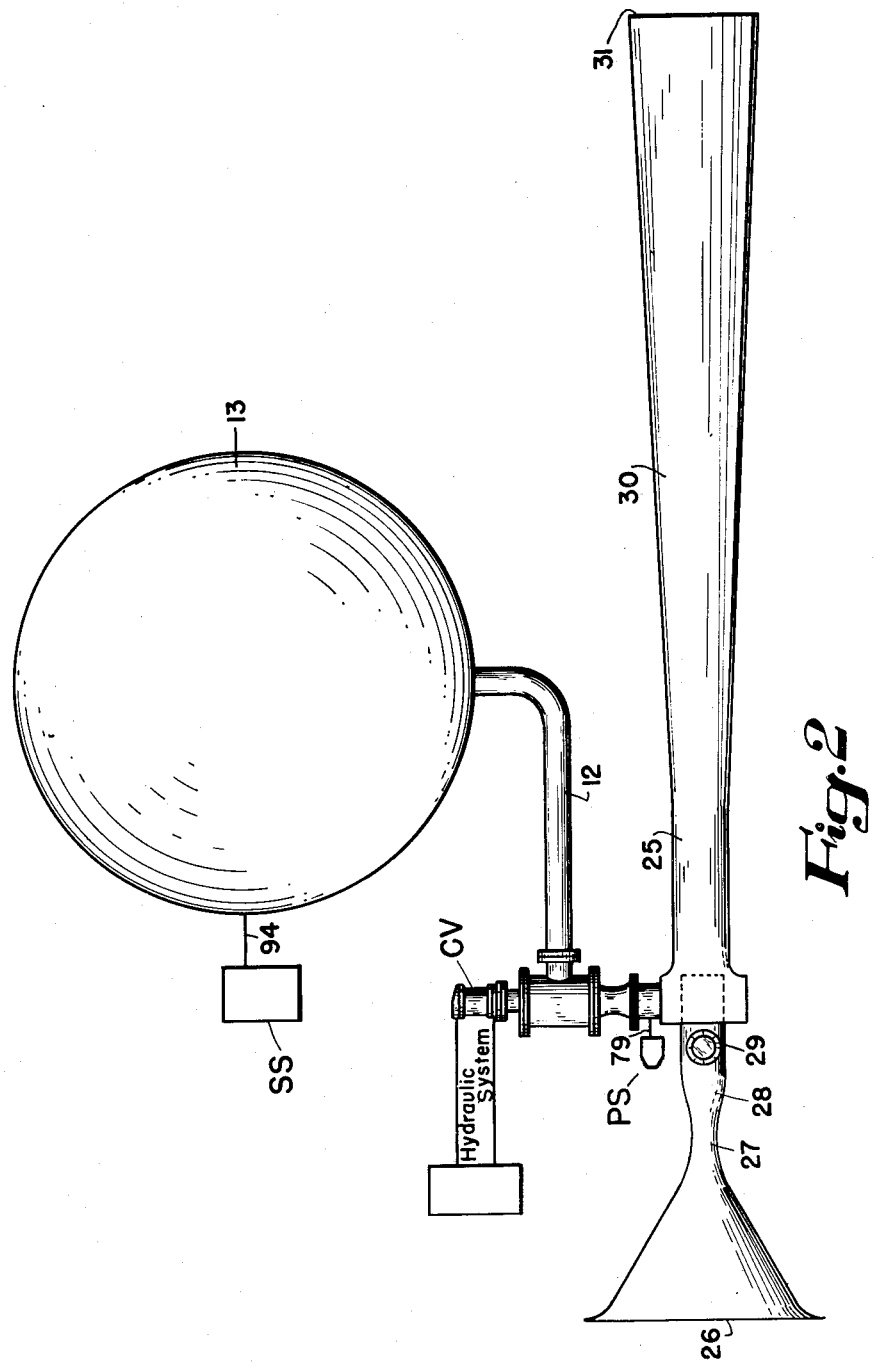
Fig. 2 is a more or less diagrammatic view of an induction type wind tunnel in connection with which the valve and hydraulic system of Fig. 1 is adapted to be used.

The coils referred to in describing the layout of Fig. 9 were type SG auxiliary relays such as disclosed in Figure 2 of Westinghouse Catalogue section 41—350 dated June 25, 1945, and the contacts having the coil letter as a prefix are parts of such relays.

Dot and dash circle 129 represents the reversing electric motor operating the hydraulic pump 43 and dot and dash circle 130 represents the constant speed non-reversing electric motor operating hydraulic pump 45.

It has been found that satisfactory control of the delivery of air to the inductor chamber of an induction type wind tunnel can be obtained by the use of the invention of this application without the use of the secondary pressure switch mechanism SS; the primary pressure switch mechanism PS being sufficient for controlling the forward and reverse movements of electric motor 129 which drives high pressure pump 43.

The secondary switch mechanism SS however, when used in series with the primary switch mechanism, affords better control when the device of this invention is used in controlling the air delivered to the heat accumulator and exchanger of a blow down type wind tunnel due to the lag occurring in such accumulator and exchanger.

When secondary pressure switch SS is omitted, points S and T are directly connected and coil V and contact V–1 are omitted.

As previously pointed out in connection with the discussion of Figure 9, the solenoid valves 44 are both opened during the operation of the system when either of the holding coils D or E is energized. Coil D is the holding coil of the electrical means or motor 129 for driving or actuating the pump 43 in a forward direction, while coil E is the reverse holding coil of the motor 129 for driving or actuating the pump 43 in a reverse direction. Since, as stated, each of the coils D and E closes contacts that energize the solenoid operated valves 44 of each pipe leg of the pair of legs 40 and 41 of the hydraulic system, it will be apparent that the solenoids of both the right and left hand valves 44 of Figure 1 will be open when the pump 43 is being driven either in a forward or a reverse direction.

Thus, at the time the pump 43 is being driven forwardly, the right-hand valve 44 of Figure 1 is open to permit a full positive pressure flow of liquid from the pump 43 along the line 40 to move the valve CV towards an open position, and the left-hand valve 44 is open to permit a return or discharge flow of liquid along the line 41 and through relief valve 53 and check valve 53a into the reservoir or liquid source 46.

On the other hand, when the motor 129 of the pump 43 is energized in a reverse direction, the coil E will close the contacts which energize the solenoids of both the valves 44 to open these valves and permit a positive flow of fluid through the left-hand valve 44 and line 41. At the same time, the right-hand valve 44 is open to permit a return or exhaust flow along line 40 through relief valve 52 and check valve 52a into the reservoir or liquid source 46.

Since valves 49a and 49b of branch line 49 and valves 50a and 50b of branch line 50 are check valves, the arrows of Figure 1 indicate the flow of liquid when the right and left-hand valves 44 are closed (before the pump 43 has been started) and when the low pressure pump 45 has been initially actuated (after switch A has been closed) to completely fill the system with an operative amount of hydraulic fluid. After the pump 43 has been started, the flow from the exhaust side of the hydraulic motor 32 will necessitate a return flow of liquid through one of the legs 40 to 41. Thus, since the relief valves 52 and 53 are each set to open at about 900 pounds per square inch pressure that there will be a pressure differential of about 100 pounds per square inch between the positive and return flow legs of the system during the operation of the hydraulic motor 32 which is operated at about 1000 pounds per square inch pressure.

It will be apparent that although I have provided a closed hydraulic system, a differential liquid flow is set up within such system which is incident to the utilization of the reservoir or source 46. There is thus no possibility of a so-called fluid lock in the operation of the system.

What I claim is:

1. A hydraulic system responsive to the pressure at which fluid is delivered from a control valve for selectively moving a hydraulic motor in valve opening and valve closing directions to determine the pressure delivered from the control valve which system comprises, a pair of piping legs, a pair of normally closed shut-off valves, one of said shut-off valves being connected in one of said piping legs, the other one of said shut-off valves being connected in the other of said piping legs, a pair of pipe branches, one of said pipe branches having its ends connected to one of said piping legs on opposite sides of its said shut-off valve, the other of said pipe branches having its ends connected to the remaining one of said piping legs on opposite sides of its said shut-off valve, a source of fluid connected to a point intermediate the ends of each of said pipe branches, a first pair of check valves, each of said first pair of check valves being connected in one of said pipe branches on opposite sides of the connection to said source of fluid, a second pair of check valves, each of said second pair of check valves being connected in the remaining pipe branch on opposite sides of the connection to said source of fluid, said first and second pairs of check valves being connected to check the flow of fluid from said pair of piping legs toward said source, a first pump operatively connected between said source and said pair of pipe branches to maintain fluid in the system, a first relief valve operatively connected to the discharge side of said first pump and vented to said source of fluid to determine the fluid pressure delivered from said pump, a second pump, said second pump being reversible and having its opposite sides connected between said pair of piping legs on a common side of said shut-off valves to selectively supply positive fluid pressure to said legs, means to open said pair of shut-off valves when said second pump is operating, a pair of second relief valves, each one of which is operatively connected to one of said pair of piping legs and effectively connected to one end of said second pump, said second relief valves having pressure settings lower than positive pressure supplied by said second pump, an excess fluid return line connected to the opposite side of said second relief valves and said source to return excess fluid to said source, a pair of third check valves connected between said second relief valves and said excess fluid return line to check a back fluid-flow from said excess fluid return line to said second relief valves and allow fluid flow to said excess fluid return line, and pressure responsive control means operatively connected to control the operation of said second pump.

2. A system as defined in claim 1 wherein said pressure responsive control means comprises, a reversible electric means operatively connected to selectively actuate said second pump in opposite directions, a dual part switch mechanism operatively connected to said electrical means to selectively energize it in opposite directions in accordance with which one of the dual parts of said switch is closed, and means normally balancing said dual parts to open positions.

3. An electro-hydraulic system for selectively moving a hydraulic motor in valve opening and closing directions to determine fluid pressure delivered thereto which comprises, a source of fluid, a pair of piping legs, a reversible fluid pump operatively connected between said source and said pair of piping legs, a reversible electric means operatively connected to actuate said pump in forward and reverse directions, a dual-part switch mechanism operatively connected to said electric means to automatically energize it in one direction when one of its dual parts is closed and to automatically energize it in an opposite direction when the other of its dual parts is closed, means normally balancing said dual parts to open positions when fluid is being delivered at a desired pressure, said balancing means having a portion actuated by an increase of fluid pressure that is above a desired value to close one of said dual parts and energize said electric means in one direction, and said balancing means having a portion actuated by an increase of fluid pressure that is below the desired value to close the other of said dual parts and energize said electric means in an opposite direction.

4. A system as defined in claim 3 wherein, said dual switch mechanism has a pivotally-mounted beam and a pair of fluid-pressure expansible members, said expansible members are operatively connected to opposite end portions of said beam, each part of said dual parts is operatively positioned adjacent one of said expansible members to be opened and closed by said beam and the expansible member connected to the opposite end portion of said beam, and one of said expansible members is connected to receive fluid under variable pressure, and the other of said expansible members contains fluid under sufficient pressure to balance said beam to a neutral-dual-part-opening position when the pressure of fluid received by said one expansible members is of a desired value.

5. A system as defined in claim 4 wherein, a second switch mechanism is operatively connected to said first-mentioned switch mechanism and said reversible electric means to further phase the operation of said electric means, and said second switch mechanism has a fluid pressure balanced switch part to energize said reversible electric means when one of the dual parts of said first-mentioned switch mechanism has closed in accordance with variations in fluid pressure.

6. A system as defined in claim 5 wherein said second switch mechanism comprises a balanced arm pivotally mounted intermediate its opposite ends, spring-balancing means is operatively connected to one end portion of said balance arm, a pair of operatively-opposed fluid-pressure-sensitive expansible members is operatively connected to said balance arm; said switch part of said second mechanism has a switch contact projecting from an opposite end portion of said balance arm; and a motor-driven drum is rotatably positioned for movement about said switch contact; and said drum has a contact strip to intermittently close contact with said switch contact during its rotation.

7. An electro-hydraulic system for selectively moving a hydraulic motor in valve opening and valve closing directions to determine fluid pressure delivered thereto which comprises, a source of fluid, a pair of piping legs, a reversible fluid pump operatively connected between said source and said piping legs, a reversible electric motor operatively connected to actuate said reversible pump in forward and reverse directions; a control mechanism comprising a pivotally-mounted beam, a pair of fluid-pressure-sensitive expansible members, one of said expansible members being operatively connected to one end portion of said beam and the other member being operatively connected to the opposite end portion thereof to move it about its pivot; a pair of switches, one of said switches being operatively positioned with respect to one end portion of said beam and the other being operatively positioned with respect to the other end portion thereof to be respectively opened and closed by movement imposed on said beam about its pivot, one of said switches being operatively connected to actuate said electric motor in a forward direction when its contacts are closed, and the other of said switches being operatively connected to actuate said electric motor in a reverse direction when its contacts are closed; said expansible members being responsive to fluid pressure to normally position said beam in a neutral and switch-contact opening position, and said expansible members having portions actuating said beam to close the contacts of one of said switches and energize said electric motor in a forward direction when fluid pressure is below a desired value and to close the contacts of the other of said switches to actuate said electric motor in a reverse direction when fluid pressure is above the desired value.

8. A system as defined in claim 7 wherein, a second control mechanism is operatively connected between said first-mentioned control mechanism and said electric motor through the contacts of both of said switches of said first-mentioned control mechanism; said second control mechanism has an adjustably-positioned balance arm, fluid-pressure-sensitive expansible members operatively connected to said adjustable arm to vary the positioning of said arm in accordance with variations of fluid pressure, and a rotatable switch mechanism periodically making electric contact with said balance arm in accordance with the variations of fluid pressure.

References Cited in the file of this patent

UNITED STATES PATENTS

| | | |
|---|---|---|
| 1,616,841 | Beebe | Feb. 8, 1927 |
| 1,938,958 | Goldman | Dec. 12, 1933 |
| 1,987,505 | Edler | Jan. 8, 1935 |
| 2,131,481 | O'Connor | Sept. 27, 1938 |
| 2,193,497 | Spire | Mar. 12, 1940 |
| 2,296,568 | Peacock | Sept. 22, 1942 |
| 2,345,919 | Davis | Apr. 4, 1944 |
| 2,355,669 | Moser | Aug. 15, 1944 |
| 2,415,783 | Bassett | Feb. 11, 1947 |
| 2,443,333 | Tucker | June 15, 1948 |
| 2,467,509 | Trautman | Apr. 19, 1949 |
| 2,489,412 | Harvey | Nov. 29, 1949 |
| 2,541,887 | Payne | Feb. 13, 1951 |
| 2,576,359 | Putnam | Nov. 27, 1951 |
| 2,586,682 | McLeod | Feb. 19, 1952 |